June 5, 1928.

P. LAGANA 1,672,765

CALIPERS

Filed June 3, 1927

Philip Lagana, INVENTOR

BY Victor J. Evans

ATTORNEY

P. J. Hickey.

WITNESS:

Patented June 5, 1928.

1,672,765

UNITED STATES PATENT OFFICE.

PHILIP LAGANA, OF DARIEN, CONNECTICUT.

CALIPERS.

Application filed June 3, 1927. Serial No. 196,355.

This invention relates to calipers, and contemplates a novel construction and arrangement of parts whereby instantaneous and accurate measurement can be determined in a manner to be hereinafter clearly set forth, the invention residing in the construction combination and arrangement of parts as claimed.

In the drawing forming part of this application, like numerals of reference indicate similar parts in the several views, and wherein:—

Figure 1:
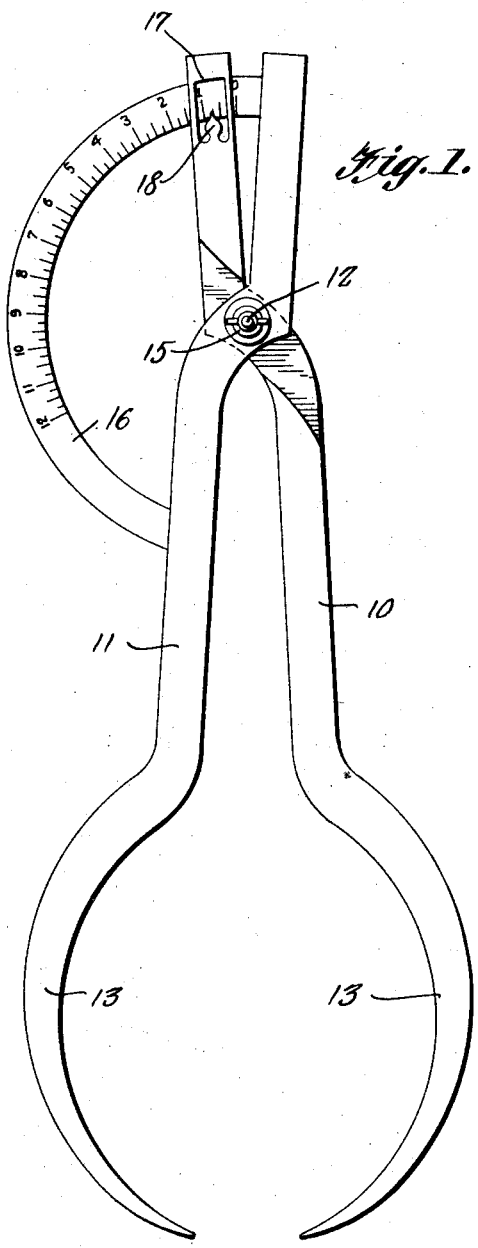
Figure 1 is a plan view of the instrument.
Figure 2:
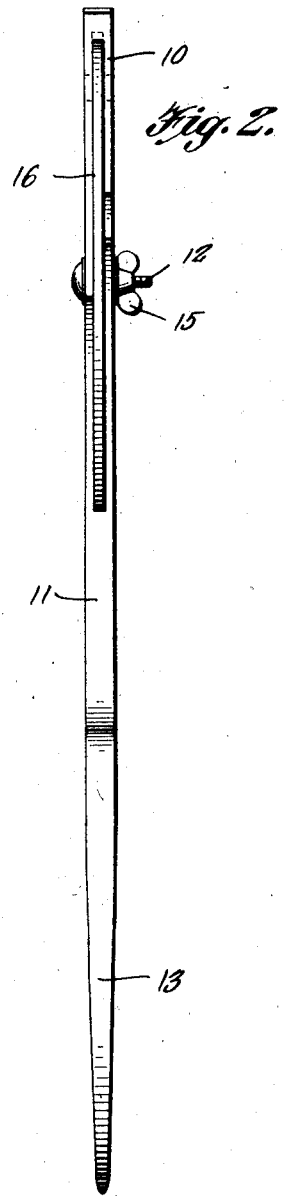
Figure 2 is a view taken at right angles to Figure 1.

Referring to the drawing in detail, 10 and 11 indicate respectively a pair of arms pivoted as at 12, the corresponding extremities of these arms being curved toward each other as at 13. The pivot includes a thumb nut 15 so that the arms can be held relatively in any given position. Carried by and projecting from one side of the arm 11 adjacent the end thereof is a semi-circular arm 16 which is suitably graduated as illustrated, this arm 16 moving concentric with relation to the pivot 12 incident to the movement of the arm 11. The adjacent end of the arm 10 is provided with a transverse slot through which the arm 16 moves, while the upper surface of this arm 10 is provided with an opening 17 through which the graduations in the arm 16 can be conveniently and easily read. The said slot is of a length greater than the width of the graduated arm 16, although one end of the slot bears against the outer or adjacent edge of said arm as illustrated. Projecting within the opening 17 from one end thereof is a pointer or indicator 18 which overlies the curved arm 16, and is of course used in conjunction with the graduations to provide means whereby measurements can be instantaneously and accurately determined. While the invention is described in connection with a pair of calipers, it is desired to have it understood that the principle embodied in the invention is susceptible to use in other capacities, in its general application as contemplated by the claim:

While it is believed that from the foregoing description, the nature and advantages of the invention will be readily apparent, I desire to have it understood that I do not limit myself to what is herein shown and described, and that such changes may be resorted to as fall within the scope of what is claimed.

What I claim is:—

A measuring instrument comprising a pair of crossed pivoted members, a semicircular graduated arm projecting from one side of one of said members, the other of said members having a longitudinal slot through which the graduated arm passes, said slot being of a length greater than the width of said arm, with one end of the slot engaging the outer edge of the arm, the upper surface of said member having an opening, and a pointer projecting within the opening from the opposite end of the slot and overlying the graduated arm to cooperate with said graduations for the purpose specified.

In testimony whereof I affix my signature.

PHILIP LAGANA.